United States Patent
Hallahan

[11] Patent Number: 5,964,337
[45] Date of Patent: Oct. 12, 1999

[54] GLASS PROCESSING MACHINE WITH ADJUSTABLE ROLLER SUPPORTS

[75] Inventor: Michael A. Hallahan, Butler, Pa.

[73] Assignee: Billco Manufacuring, Inc.

[21] Appl. No.: 09/076,400

[22] Filed: May 12, 1998

[51] Int. Cl.[6] .................................................. B65G 13/02
[52] U.S. Cl. ........................................ 198/780; 193/35 R
[58] Field of Search ........................ 198/780; 193/35 R; 384/418, 428, 539

[56] References Cited

U.S. PATENT DOCUMENTS

| | | | |
|---|---|---|---|
| 3,550,674 | 12/1970 | Gallucci | 198/624 X |
| 4,358,165 | 11/1982 | Julius et al. | 308/22 X |
| 4,907,632 | 3/1990 | Reuter | 198/624 X |
| 5,111,930 | 5/1992 | Ginzburg et al. | 198/780 X |
| 5,395,171 | 3/1995 | Waskiewicz | 384/428 |
| 5,630,669 | 5/1997 | Stewart | 384/570 |

*Primary Examiner*—William E. Terrell
*Assistant Examiner*—Gene O. Crawford
*Attorney, Agent, or Firm*—Webb Ziesenheim Logsdon Orkin & Hanson, P.C.

[57] ABSTRACT

A glass workpiece processing apparatus, such as a glass washer, includes a frame, a pair of rails attached to and extending along the frame, a plurality of workpiece supporting rollers positioned along the pair of rails, and a pair of bearing stands rotatably supporting each roller. Each bearing stand includes a base removably attached to one rail, a bearing attached to said base which rotatably supports the roller, and a releasable bearing retaining member attaching the bearing to the base. The bearing retaining member may be a snap-on clip including locking projections engaging corresponding locking notches in the base. Alternatively, the retaining member may include a stop screw threaded through a portion of the base.

18 Claims, 7 Drawing Sheets

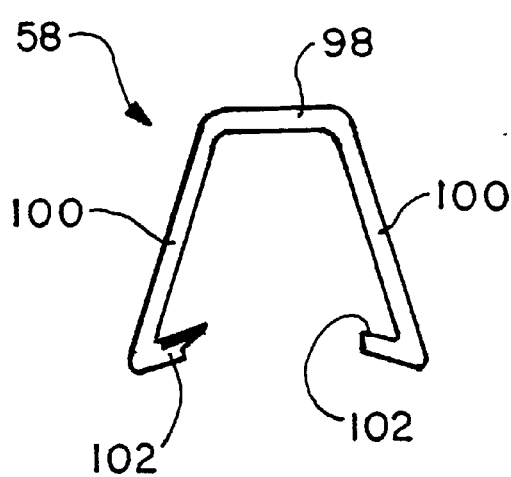
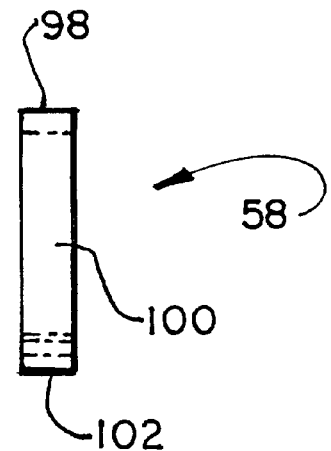
FIG. 9     FIG. 10
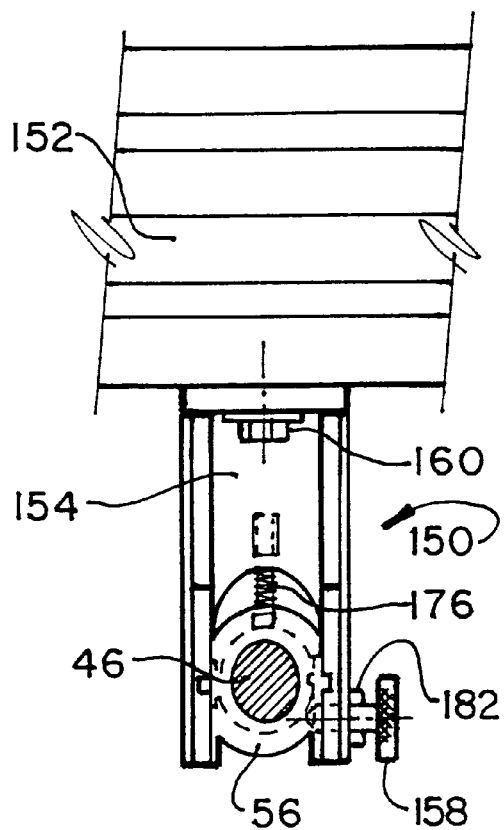
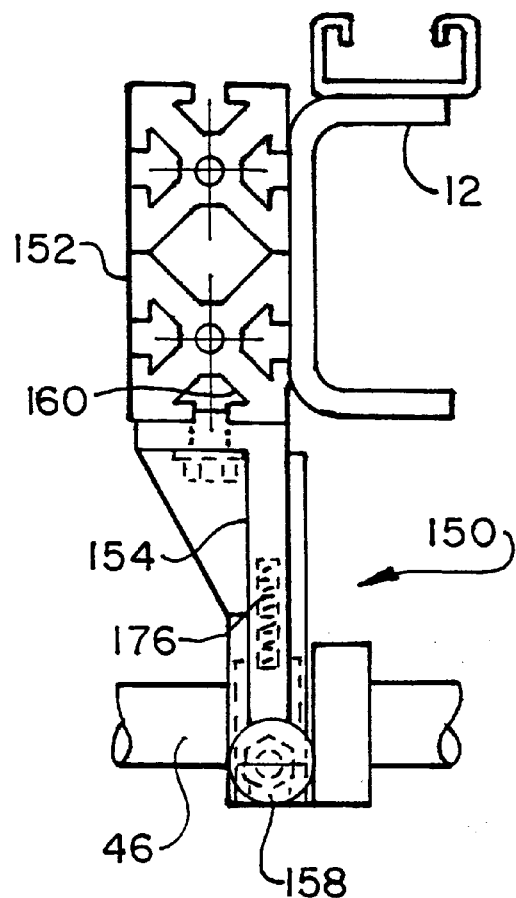
FIG. 11     FIG. 12

GLASS PROCESSING MACHINE WITH ADJUSTABLE ROLLER SUPPORTS

BACKGROUND OF THE INVENTION

1. Field of the Invention

The present invention relates to glass processing machines, more particularly, to improved roller supports for glass processing equipment.

2. Background Information

Processing lines for glass products, such as automobile windshields, window units, or the like, generally include a series of rollers for supporting and advancing the workpiece. The rollers may be driven for automatically advancing the glass sheet. The series of rollers can be incorporated into a wide variety of glass processing equipment, such as a cutting table used to sever glass workpieces, a glass washing machine used to clean glass workpieces for subsequent processing, an oven used for heating glass workpieces and curing additions thereto and a transfer table or conveyor used simply to transport product to a station such as a breakout station, a grinding station, an inspection station or a polishing station. These examples are intended to represent the wide variety of glass processing equipment which may incorporate rollers. Essentially, any automated operation required to be performed on the desired workpiece may incorporate rollers supporting the workpiece.

In designing a specific piece of glass processing equipment utilizing a series of rollers for workpiece support, the spacing of the rollers is important. Of course the rollers must be spaced sufficiently close together to provide adequate support for the workpiece and easily advance the workpiece. More significantly, however, is the need to position the rollers around other components of the specific glass processing equipment. With this criteria in mind, roller supports have been designed to increase the flexibility of the specific roller placement design.

For example, see U.S. Pat. No. 5,196,676 to Hallahan which is assigned to Billco Manufacturing, Inc. the assignee of the present application. The '676 patent discloses a glass workpiece oven in which roller supports, and other components of the oven, are attached to a unistrut structure 54. The roller supports are best illustrated in FIG. 7 and comprise bearing stands which are bolted by a pair of spaced bolts to the unistrut structure 54. The unistrut structure 54 allows the rollers to be relatively easily positioned along the length thereof. The unistrut structure 54 allows for easy installation, replacement or movement of the respective rollers, thereby allowing the machine to be easily designed to the specific user requirements.

The relatively flexible design of the '676 patent has several drawbacks. The design of the '676 patent does not provide for fast bearing removal, particularly on rollers having drive components, collars, water seals or the like. The design of the '676 patent does not provide for easy removal of the bearing using a minimum of tools. The design of the '676 patent does not provide for the close arrangement of adjacent rollers.

Additionally, in certain equipment upper rollers are used, positioned opposed from lower rollers to form a pinch roll combination for engaging and advancing the workpiece. In glass washing machines, for example, pinch rolls have been used for engaging the glass workpiece at selected locations along the washer. The design of the '676 patent does not provide for an upper set of rollers, such as may be used in a glass washing machine.

It is the object of the present invention to overcome the aforementioned disadvantages of the prior art.

SUMMARY OF THE INVENTION

The above-described objects are achieved by a glass processing machine according to the present invention. The glass workpiece processing apparatus, such as a glass washer, according to the present invention includes a frame, at least one pair of rails attached to and extending along the frame, a plurality of workpiece supporting rollers positioned along one pair of rails, and a pair of bearing stands rotatably supporting each roller. Each bearing stand includes a base removably attached to one rail, a bearing attached to said base which rotatably supports the roller and a releasable bearing retaining member attaching the bearing to the base.

In one aspect of the present invention, the bearing retaining member may be a snap-on clip including locking projections engaging corresponding locking notches in the base. In another aspect of the present invention, the retaining member may include a stop screw threaded through a portion of the base. A glass processing apparatus, such as a glass washing machine, may include both bearing stands, wherein at least one pair of rollers are arranged in a pinch roll combination.

These and other advantages of the present invention will be clarified in the description of the preferred embodiments taken together with the attached drawings wherein like reference numerals represent like elements throughout.

BRIEF DESCRIPTION OF THE DRAWINGS

FIG. 9 is a front view of a retaining clip of the lower bearing stand illustrated in FIG. 2;

FIG. 10 is a side view of the retaining clip illustrated in FIG. 9;

FIG. 11 is a front view of an upper bearing stand used in the glass washing machine illustrated in FIGS. 1*a* and 1*b*;

FIG. 12 is a side view of the upper bearing stand illustrated in FIG. 11;

DESCRIPTION OF THE PREFERRED EMBODIMENTS

The present invention is directed to the construction of glass workpiece processing apparatus. Specifically the present invention provides a conveyor for such processing equipment which can be easily constructed and easily modified to accommodate various additional components of the apparatus without requiring special manufacturing steps. This allows the conveyor to be easily incorporated into a large variety of equipment designs and allows individual units to be customized to specific needs. The conveyor of the present invention provides additional advantages relating to improved replacement and adjustment features which will be better understood with a description of one specific embodiment of the present invention.

Figure 1A:
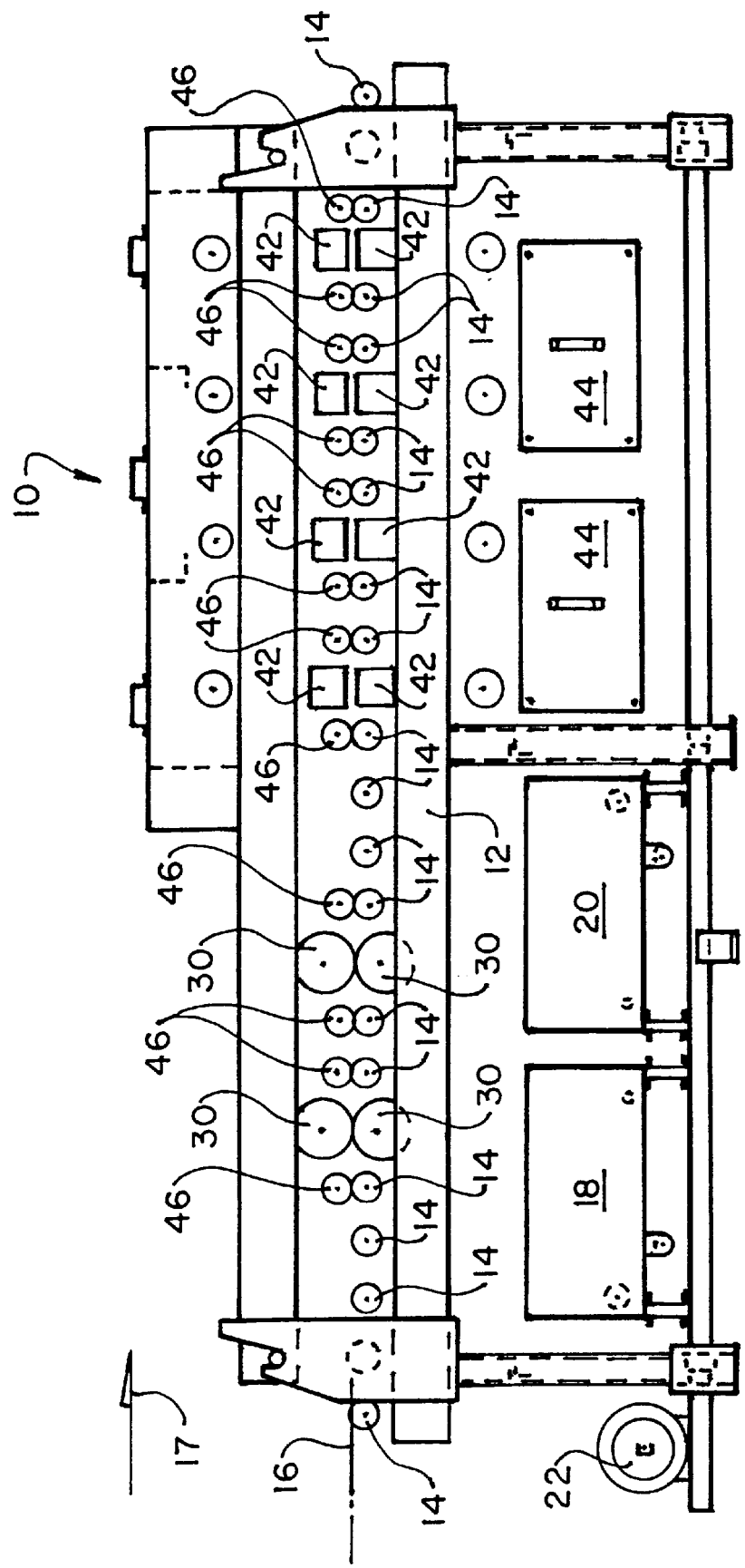
FIGS. 1*a* and 1*b* schematically illustrate a glass washing machine incorporating the conveyor and bearing stands according to the present invention.
Figure 1B:
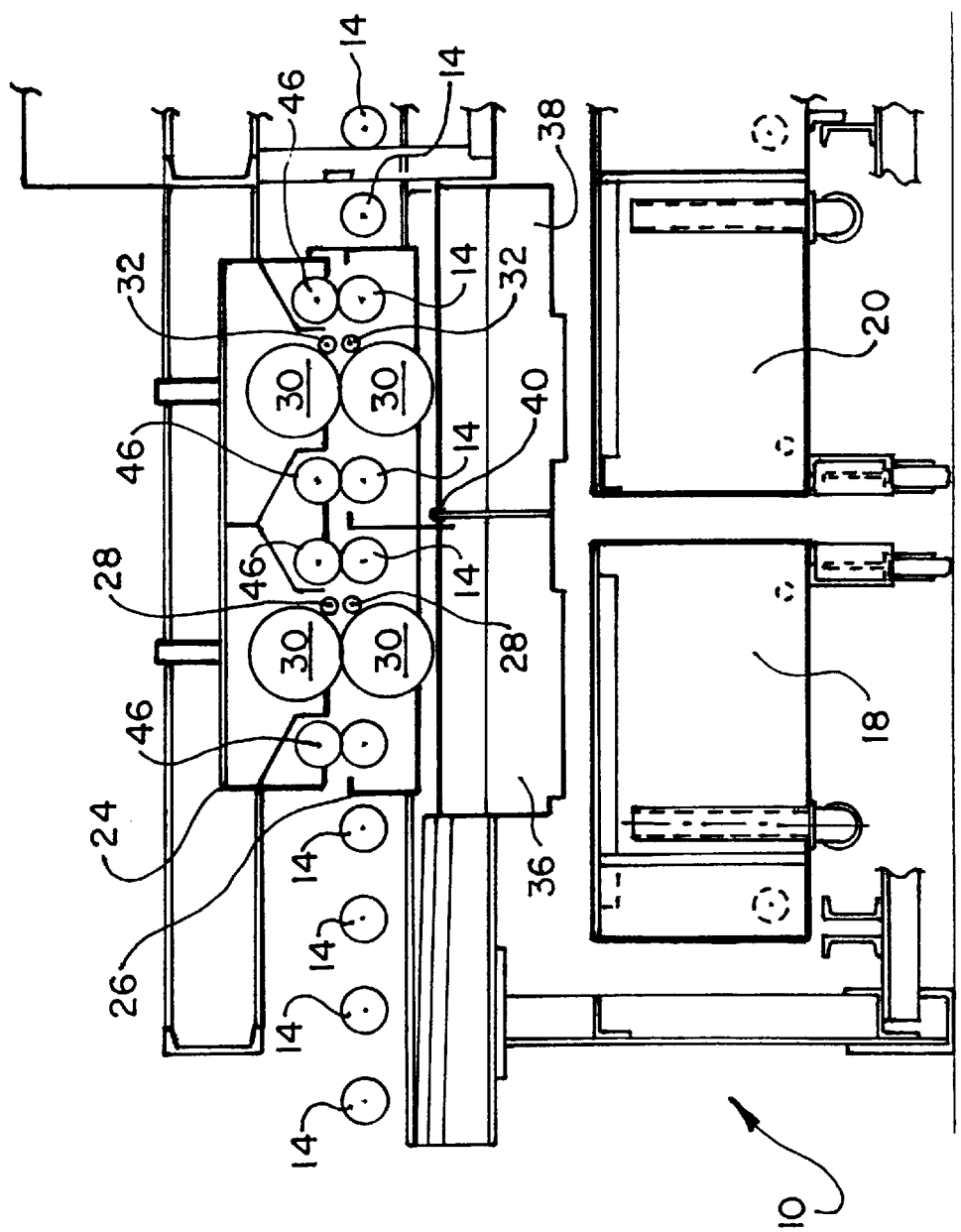

FIGS. 1a and 1b schematically illustrate a glass washing machine 10 incorporating the conveyor according to the present invention. The glass washing machine 10 includes a frame 12 and a plurality of lower workpiece supporting rollers 14 positioned along a pass line 16 for transporting the glass workpieces (not shown) in the direction noted by travel arrow 17. The workpiece supporting rollers 14 may be more broadly considered as workpiece engaging rollers.

The forward portion of the glass washing machine defines a washing section which includes a wash tank 18, a rinse tank 20 and at least one pump 22 to supply the washing and rinsing liquid to the glass workpieces in a washing chamber which is better shown in FIG. 1b. As shown in FIG. 1b, an upper splash guard 24 and a lower splash guard 26 define the washing chamber. In the washing chamber, washing liquid is supplied against both sides of the glass workpieces through high pressure spray line 28 positioned adjacent a pair of rotary brushes 30. Further downstream along the conveyor, rinsing liquid is supplied against both sides of the glass workpieces through high pressure spray lines 32 positioned adjacent another pair of rotary brushes 34. The washing liquid and the rinsing liquid is supplied to the spray lines 28 and 32 from respective tanks 18 and 20 through pump 22. Although only one pump 22 is illustrated, more than one pump may be provided, such as one for each liquid. Washing liquid and rinsing liquid are recovered in respective catch pans 36 and 38 and returned to respective tanks 18 and 20. A barrier 40 separates the catch pans 36 and 38 to maintain separation between the wash liquid and the rinse liquid.

The rearward portion of the glass washing machine defines a drying section which includes a plurality of upper and lower air knifes 42 positioned on either side of the pass line 16. Jets of drying air are directed to both sides of the glass workpiece by each air knife 42 for drying of the glass workpiece. Compressed or forced air is directed to the air knives 42 from a blower (not shown) through associated duct work (not shown). The drying section may also include catch pans (not shown) below the air knives 42 which are accessed through panels 44. The drying section can represent a significant amount of the noise produced by the glass washing machine 10 due to the blower and the like, and may be both isolated and insulated to reduce the noise level around the machine.

The glass washing machine additionally provides a series of upper workpiece engaging rollers 46 at spaced locations along the length of the glass washing machine. The workpiece engaging rollers 46 are positioned to be aligned with selected workpiece supporting rollers 14 to form pinch rolls for engaging and advancing the glass workpieces. Additionally, at least some of the workpiece supporting rollers 14 and the workpiece engaging rollers 44 will be driven, such as by a chain drive, for automatically advancing the glass workpieces. A chain drive allows a series of rollers 14 and 46 to be driven in synchronous. Alternatively, independent driving motors may be used for separate rollers 14 and 46.

From the foregoing it will be evident that any roller 14 and 46 may have a drive train, sealing members and other extra components associated therewith. These additional elements can make the removal of a roller 14 or 46 significantly time consuming. Additionally, from the foregoing it is apparent that the conveyor formed by rollers 14 and 46 must be spaced to accommodate various additional components therein such as the brushes 30 and 34 and the air knives 42. As discussed below, the present invention easily accommodates these design and operational issues.

Figure 2:
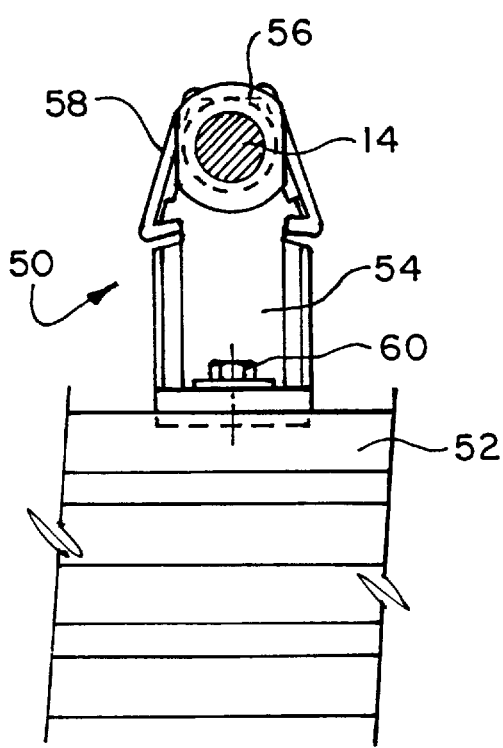
FIG. 2 is a front view of a lower bearing stand used in the glass washing machine illustrated in FIGS. 1*a* and 1*b*.
Figure 3:
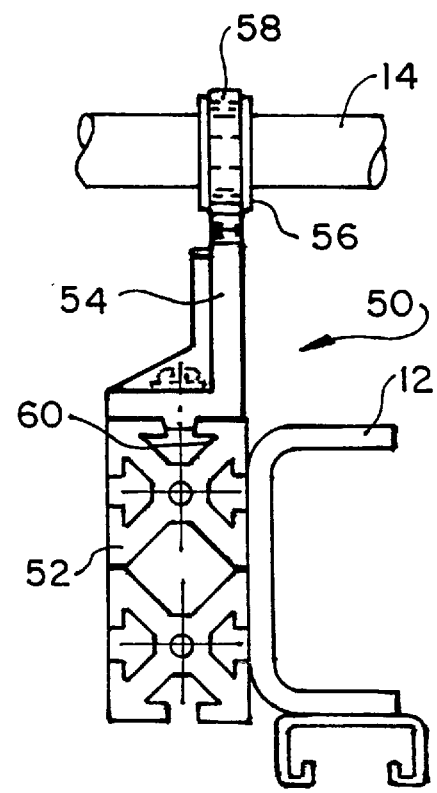
FIG. 3 is a side view of the lower bearing stand illustrated in FIG. 2.

FIGS. 2 and 3 illustrate a lower bearing stand 50 used in the glass washing machine 10 illustrated in FIG. 1a and 1b. A pair of rails 52 are attached to and extend along the frame 12, with each rail 52 being on one side of the glass washing machine 10. Only one rail 52 is shown in FIGS. 2 and 3. The workpiece supporting rollers 14 are positioned along the pair of rails 52 and are supported thereon by a pair of bearing stands 50. One bearing stand 50 is at each respective end of each roller 14. The roller 14 may extend beyond the bearing stand 50 for attachment of chain drives or the like. Each bearing stand 50 rotatably supports each roller 14 with each bearing stand 50 including a base 54 removably attached to one rail 52, a bearing 56 supported on the base 54 and rotatably supporting the roller 14, and a releasable bearing retaining member in the form of a clip 58 attaching the bearing 56 to the base 54. The bearing stand 50 is releasably attached to the rail 52 through an easily released, single bolt member 60 extending through the base 54. The bolt member 60 includes an enlarged head which rides in a t-shaped slot of the rail 52 in a conventional fashion. This arrangement allows for the bearing stand 50 and the associated roller 14 to be easily positioned, repositioned or removed along the length of the rail 52.

Figure 4:
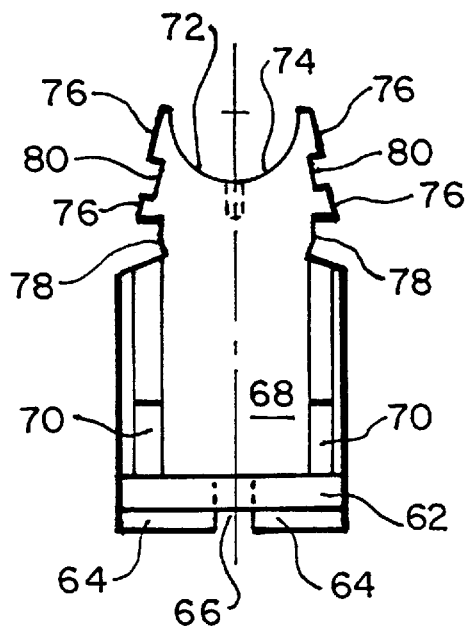
FIG. 4 is a front view of a base of the lower bearing stand illustrated in FIG. 2.
Figure 5:
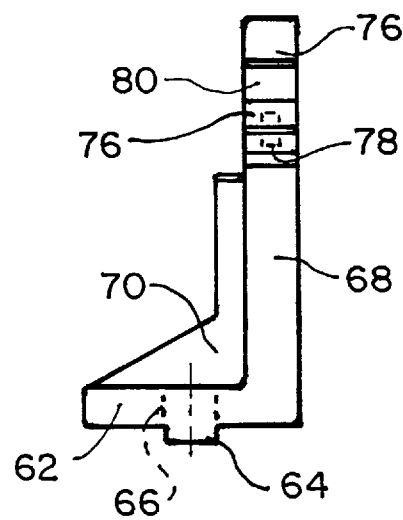
FIG. 5 is a side view of the base illustrated in FIG. 4.

The base 54 is illustrated in FIGS. 4 and 5. The base includes a bottom member 62 which rests upon the rail 52. The bottom member 62 includes a lower projection 64 which rides in the slot in the rail 52 to provide alignment and stability to the base 54. A hole 66 extends through the bottom member 62 for receipt of the bolt member 60. A generally vertically extending member 68 extends up from the bottom member 62, providing a general L-shape to the base 54, as shown in FIG. 5. Supporting ribs 70 extend from the bottom member 62 to the vertical member 68 for additional structural support to the base 54.

The upper portion of the vertically extending member 68 includes a circular seat 72 for supporting the bearing 56. A pin receiving hole 74 may be included in the seat 72 for orientating the bearing 56 as will be described. The upper portion of the vertically extending member 68 also includes converging or sloped sides 76 corresponding to the shape of the clip 58. A pair of locking notches 78 and release notches 80 are provided in the sides 76 which are for holding and releasing of the clip 58, as will be described. The base 54 is designed as a one-piece moldable element which may be formed as a reinforced polymer casting. Many suitable plastic materials may be used, as is known in the casting or molding art.

Figure 6:
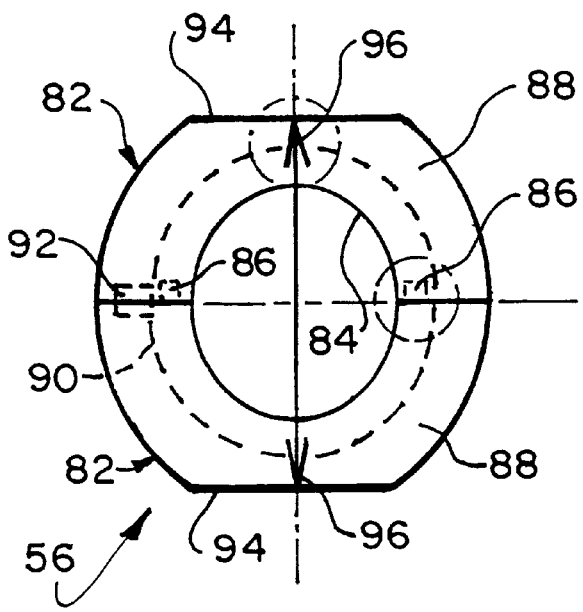
FIG. 6 is a front view of a bearing for use in the bearing stands of the glass washing machine illustrated in FIGS. 1*a* and 1*b* including the lower bearing stand illustrated in FIG. 2.
Figure 8:
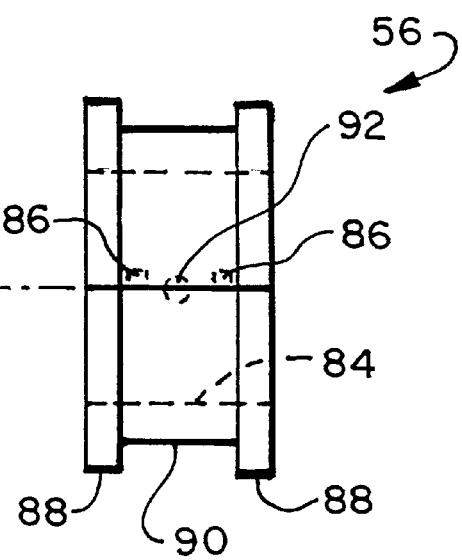
FIG. 8 is a side view of the bearing illustrated in FIG. 6.
Figure 7:
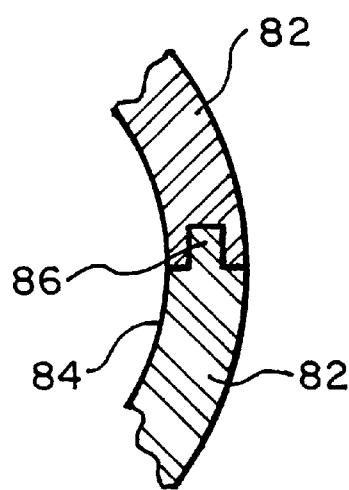
FIG. 7 is a sectional view of a portion of the bearing illustrated in FIG. 6

The bearing 56 is illustrated in FIGS. 6, 7 and 8. The bearing 56 includes a pair of bearing halves 82 defining a smooth central bore 84 which forms the bearing surface for rotatably receiving the roller 14. The bore 84 may be chamfered at the ends thereof as shown in FIG. 8. The bearing halves 82 are connected by a pair of posts 86 on each the bearing halves 82 which are received in tight-fitting mating recesses in the other bearing halve 82, as best illustrated in FIG. 7. The bearing halves 82 may be made identical if posts 86 and mating recesses are provided alternately on each bearing halve 82, thereby reducing molding requirements. The bearing halves 82 each include front and rear plates 88 defining a groove 90 therebetween, as best shown in FIG. 8. In the bearing stand 54, portions of the vertically extending member 68 of the base 54 and portions of the retaining clip 58 are received within the groove 90 to help secure the bearing 56. The groove 90 is formed with a crowned configuration to allow for some self alignment to the bearing 56, in operation. A locating pin 92 is also formed in the groove 90. The locating pin is received within the pin receiving hole 74 of the base 54 for location and orientation of the bearing 56. The front and rear plates 88 of each bearing halve 82 each include a truncated flat side 94 with orientating indicia in the form of an arrow 96 aligned with the flat side 94. The operation of the flat sides 94 and arrows 96 will be discussed below. The bearing 56 may be formed of a delrin polymer compound which has a relevant coefficient of friction of 0.12 or less. Other sufficiently hard materials with low coefficient of frictions may be used. Additionally, bearing arrangements using inner and outer raceways may be used, however, this creates a significantly more complicated bearing arrangement.

The retaining clip 58 is shown in FIGS. 9 and 10. The retaining clip 58 includes a generally flat top portion 98 with sides 100 diverging therefrom. The diverging sides 100 generally correspond in shape to the converging sides 76 of the base 54 and overlap the release notches 80 of the base 54. At the end of each side 100 is an inwardly extending projection 102 which engages with the locking notches 78 of the base 54 to secure the clip 58 to the base 54. The top portion 98 is received within groove 90 of the bearing 56 to secure the bearing 56. The bearing retaining clip 58 is designed as a flexible snap on type clip. For easy removal of the clip 58, a flat blade screwdriver, or other prying instrument, is placed in one of the release notches 80 and used to easily disengage one projection 102 from the corresponding locking notch 78. If needed the process may be repeated with the other release notch 80. Delrin also provides an adequate material for the construction of the clip 58, however, other suitable materials are possible.

It is evident from the foregoing that the bearing stand 50 allows for easy positioning, repositioning and repair of the rollers 14. A pair of the bearing stands 50 provide both 90° alignment to the rails 52 of frame 12 and parallelism of the rollers 14. For repair, the bearing stand 50 allows the bearing 56 to be replaced without disconnecting the drive or other components of the roller 14 due to the snap on retaining clip 58 and the split bearing 56. In an alternative design (not shown) the snap on retaining clip 58 may be hinged to the base 54 such that the retaining clip 58 remains attached to the base 54 when unassembled. The single bolt attachment of the bearing stand 50 also increases the ease of installation. Further, the base 54 has a width along the rails 52 which is less than the width of the clip 58 along the rails 52 and allows for compact/close positioning of adjacent rollers 14. The L-shaped construction of the base 54 further assists in the compact positioning by allowing for the alternation of the orientation of adjacent bases 54. This alternation of adjacent bases 54 will provide an offset in adjacent vertical members 68 providing sufficient access for repair and assisting in the compact arrangement. The generally narrow base 54 provides great flexibility in the positioning of roller 14 and the accommodation of additional components of the glass washing machine 10 or any glass processing machine.

Figure 15:
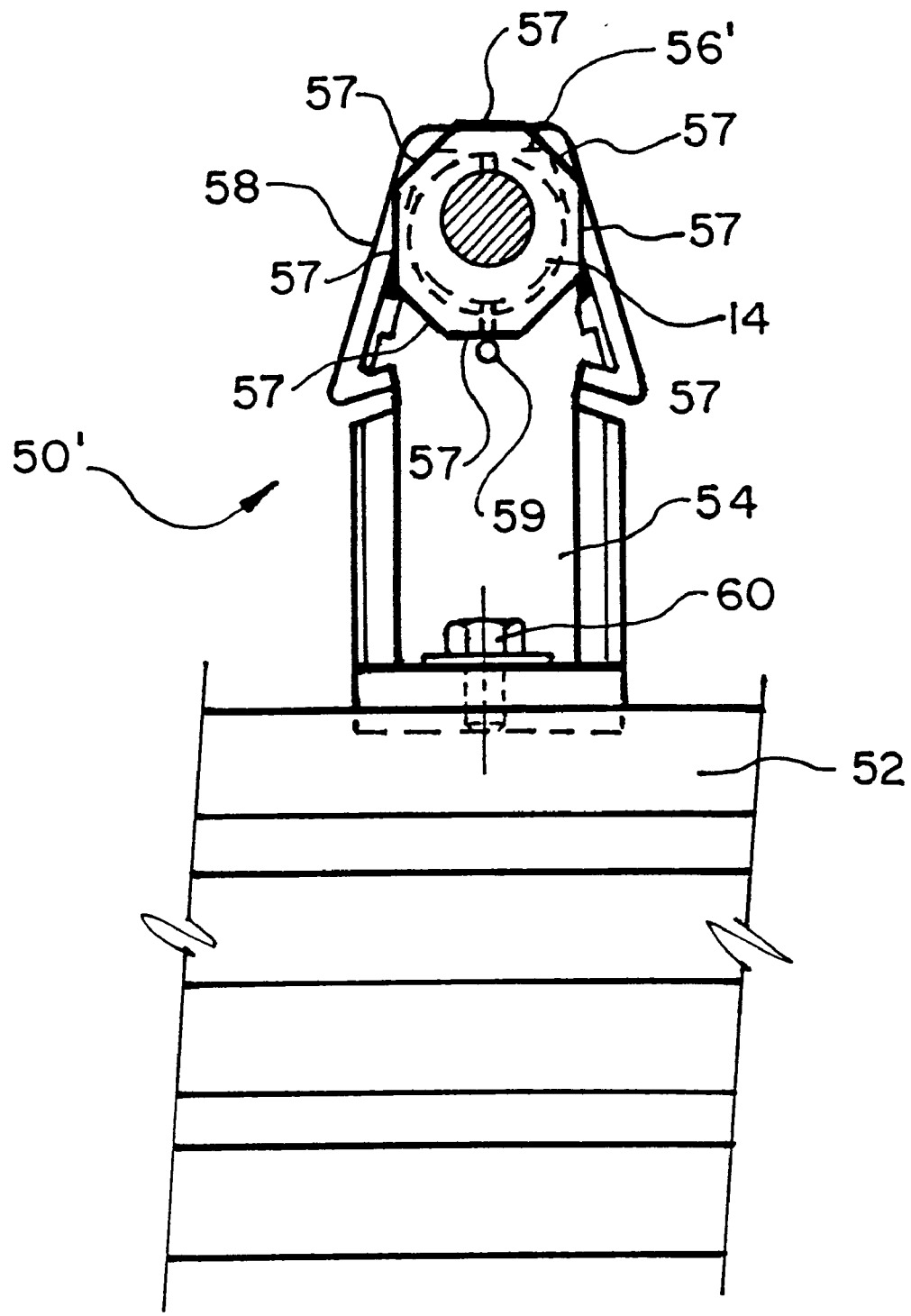
FIG. 15 is a front view of a modified lower bearing stand according to the present invention.

A further modification, shown in FIG. 15, of the bearing stand 50 will provide for height adjustment to the modified bearing stand 50'. Specifically, the bearing 56' of the modified bearing stand 50' can be designed with an eccentric central axis that incorporates an offset to provide adjustable height to the roller 14. Rotation of the modified bearing 56' in the base 54 will vary the height of the roller 14 by a desired amount. The modified bearing 56' has a number of flats 57 with a lock pin member 59 secured in the base 54. Rotation of the modified bearing 56' can determine the height of the roller 14. Rotation of the modified bearing 56' requires removal or movement of the lock pin member 59. For example, the lock pin member 59 may be pushed into the base 54 to allow for rotation of modified bearing 56'. The quantity of flats 57 provided determines the incremental adjustments of change in the height of the roller 14. Cleaning technology on curved parts and the possibility of changing product passline height may make this embodiment useful.

One disadvantage of this embodiment is that the modified bearings 56' on opposite sides of the roller 14 must be maintained in the same rotational position relative to each other in order to maintain the roller 14 in alignment.

FIGS. 11 and 12 illustrate an upper bearing stand 150 used in connection with upper workpiece engaging rollers 46 in the glass washing machine 10 illustrated in FIGS. 1a and 1b. The upper bearing stand 150 is analogous to the lower bearing stand 50 described above. A pair of rails 152 are attached to and extend along the frame 12, with each rail 152 being on one side of the glass washing machine 10. Only one rail 152 is shown in FIGS. 11 and 12. The workpiece engaging rollers 46 are positioned along the pair of rails 152 and are supported thereon by a pair of bearing stands 150. One bearing stand 150 is at each respective end of each roller 46. The roller 46 may extend beyond the bearing stand 150 for attachment of chain drives or the like. Each bearing stand 150 rotatably supports each roller 46 with each bearing stand 150 including a base 154 removably attached to one rail 152, a bearing 56 attached to the base 154 and rotatably supporting the roller 46, and a releasable bearing retaining member in the form of a threaded stop member 158 attaching the bearing 156 to the base 154. The same bearing 56 is used in both bearing stands 50 and 150. The bearing stand 150 is releasably attached to the rail 152 through an easily released, single bolt member 160 extending through the base 154 in the same manner as bolt member 60 discussed above.

Figure 14:
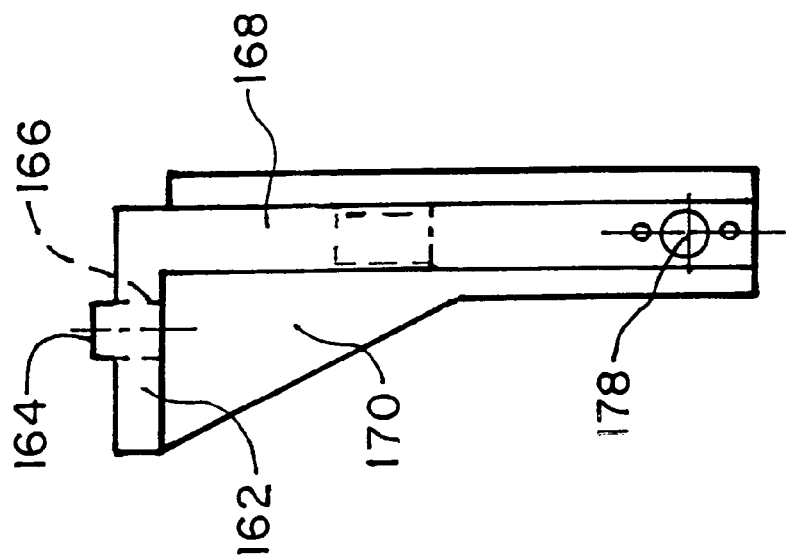
FIG. 14 is a side view of the base illustrated in FIG. 13.
Figure 13:
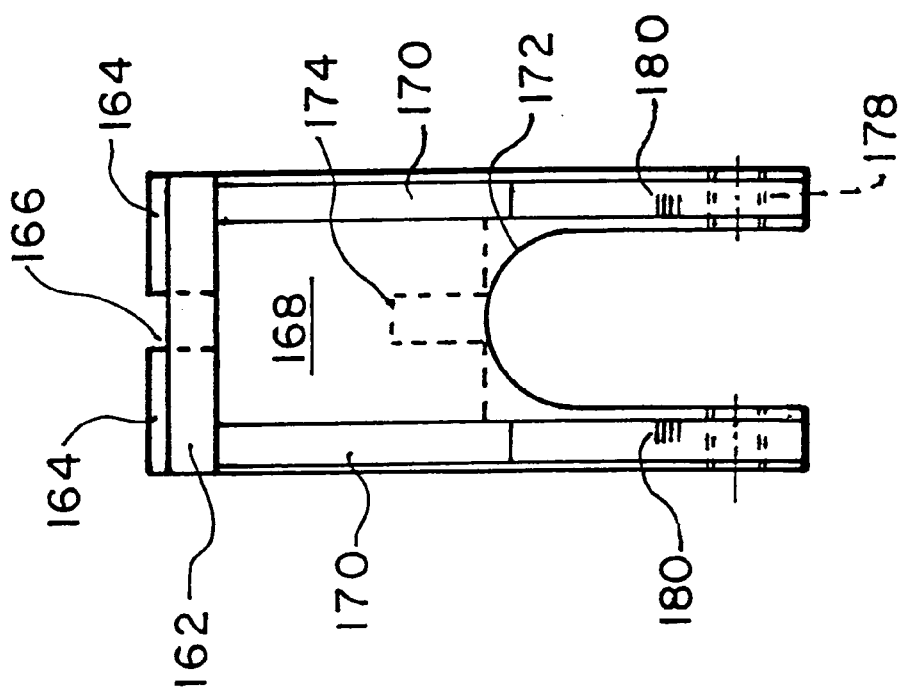
FIG. 13 is a front view of a base of the upper bearing stand illustrated in FIG. 2.

The base 154 is illustrated in FIGS. 13 and 14. The base includes a top member 162 which is adjacent the rail 152. The top member 162 includes a projection 164 which rides in a slot in the rail 152 to provide alignment and stability to the base 154. A hole 166 extends through the top member 162 for receipt of the bolt member 160. A generally vertically extending member 168 extends away from the top member 162, providing a general L-shape to the base 154 as shown in FIG. 14. Supporting ribs 170 extend from the top member 162 to the vertical member 168 for additional structural support to the base 154.

The vertically extending member 168 includes a slot 172 for receiving the bearing 56. A spring receiving hole 174 is included in the end of the slot 172 which receives a spring 176 (shown in FIGS. 11 and 12) for biasing the bearing 56, as will be described. The base 154 includes a tapped hole 178 for threadingly receiving stop member 158. A plurality of indicia in the form of strike marks 180 are on the ribs 170, as shown in FIG. 13. The strike marks 180 will be used to adjust and level the bearing 56 and the associated roller 46, as will be described. The base 154 is designed as a one-piece moldable element which may be formed as a reinforced polymer casting. Many suitable plastic materials may be used, as is known in the casting or molding art.

In the assembled condition, the bearing 56 is received in the slot 172 with portions of the vertical member 168 and the stop member 158 received in the groove 90 of the bearing 56 to position and secure the bearing 56. The stop member 158 additionally prevents the bearing from exiting the slot 172. The spring 176 biases the bearing 56 toward the stop member 158. Additionally, the spring 176, such as a coil spring, can surround the pin 92 of the bearing 56 to further locate the bearing 56. The stop member 158 is used to adjust the relative position of the bearing relative to the base 154. The stop member 158 may further include a threaded jam nut 182 which can be adjustably positioned at the desired setting for the stop member 158. The adjustment operation operates as follows: the stop member 158 is threaded into tapped hole 178 until the desired position of the bearing 56 relative to the base 154 is obtained; the jam nut 182 is then tightened against the base 154 to secure the stop member 158 in the desired location. The stop member 158 may still be easily removed to remove and/or replace the bearing 56 with the jam nut 182 designating the desired position when reassembled. The strike marks 180 are aligned with the arrows 96 of the bearing 56 to provide easy visual indication of the relative position of the bearing 56 relative to the base 154. Additionally, as shown in FIG. 13, the flat sides 94 of the bearing 56 accommodate the ribs 178 of the base 156.

It is evident from the foregoing that the bearing stand 150 is similar to bearing stand 50 and allows for easy positioning, repositioning and repair of the rollers 46. A pair of the bearing stand 150 provides both 90° alignment to the rails 152 of the frame 12 and parallelism of the roller 46. The bearing stand 150 also provides easy vertical adjustment for the upper roller 46 of the pinch roll combination. The bearing stand 150 provides up to ½ inch of vertical range to the roller 46 for conveying products of various thicknesss, curvature, contour and surface deviations. For repair, the bearing stand 150 allows the bearing 56 to be replaced without disconnecting the drive or other components of the roller 46 due to the threaded stop member 158 and the split bearing 56. The jam nut 182 on the stop member 158 may be replaced with a threaded collar (not shown) for tool free tensioning. Preferably, the spring 176 is attached to the base 152 to prevent fallout when removing the roller 46 and/or the bearing 56. The single bolt attachment of the bearing stand 150 also increases the ease of installation. The L-shaped construction of the base 154 assists in the compact positioning in the same manner as base 54 discussed above. The generally narrow base 154 provides great flexibility in the positioning of roller 46 and the accommodation of additional components of the glass washing machine 10.

The bearing stands 50 and 150 may be used to support other washing machine components such as spray lines 28 and 32. The design of the bearing stands 50 and 150 may be enlarged or reduced to accommodate other components as well.

The present invention is not intended to be limited to the specific glass washing machine illustrated and can be applied to the construction of any glass processing equipment. Further, although disclosed in connection with glass processing equipment, many of the concepts of the present invention are not limited thereto. It will be apparent to those of ordinary skill in the art that various modifications may be made to the present invention without departing from the spirit and scope thereof. Therefore, the scope of the present invention is intended to be defined by the appended claims and equivalents thereto.

What is claimed is:

1. A glass workpiece processing apparatus comprising:
    a frame;
    a pair of rails attached to and extending along said frame;
    a plurality of workpiece engaging rollers positioned along said pair of rails; and
    a pair of bearing stands rotatably supporting each said roller, each said bearing stand including a base removably attached to one said rail, a bearing attached to said base and rotatably supporting said roller, and a releasable bearing retaining member attaching said bearing to said base, further including a groove in said bearing, wherein a portion of said retaining member is received in said groove.

2. The apparatus of claim 1 wherein each said base is attached to said rail by a single bolt.

3. The apparatus of claim 1 wherein each said base is L-shaped in a cross section taken along the length of said roller.

4. The apparatus of claim 1 wherein each said bearing is a split bearing formed of two separable halves surrounding said roller.

5. The apparatus of claim 1 wherein each said base has a width in a direction parallel to said rails which is less than a width of said releasable bearing retaining member in said direction parallel to said rails.

6. The apparatus of claim wherein a portion of said base is received in said groove.

7. A glass workpiece processing apparatus comprising:
    a frame;
    a pair of rails attached to and extending along said frame;
    a plurality of workpiece engaging rollers positioned along said pair of rails; and
    a pair of bearing stands rotatably supporting each said roller, each said bearing stand including a base removably attached to one said rail, a bearing attached to said base and rotatably supporting said roller, and a releasable bearing retaining member attaching said bearing to said base, wherein said bearing retaining member is a snap-on clip including locking projections engaging corresponding locking notches in said base.

8. The apparatus of claim 7 wherein said base further includes at least one release notch which is overlapped by said snap-on clip, wherein said release notch provides access for removing said clip.

9. A bearing stand adapted to rotatably support a roller, said bearing stand comprising:
    a base adapted to be removably attached to a rail;
    a bearing attached to said base and adapted to rotatably support the roller; and
    a releasable bearing retaining member attaching said bearing to said base, wherein each said bearing is a split bearing formed of two separable halves surrounding the roller and includes a groove in said bearing, wherein a portion of said retaining member and a portion of said base are received in said groove.

10. The bearing stand of claim 9 wherein said base is L-shaped in a cross section, and said base has a width which is less than a width of said releasable bearing retaining member.

11. The bearing stand of claim 9 wherein said retaining member adjustably positions said bearing relative to said base.

12. The bearing stand of claim 9 further including a spring biasing said bearing toward said retaining member.

13. The bearing stand of claim 12 further including indicia on said bearing and said base identifying the relative position of said base and said bearing.

14. The bearing stand of claim 12 wherein said retaining member includes a stop screw threaded through a portion of said base.

15. A bearing stand adapted to rotatably support a roller, said bearing stand comprising:

a base adapted to be removably attached to a rail;

a bearing attached to said base and adapted to rotatably support the roller; and a releasable bearing retaining member attaching said bearing to said base, wherein said bearing retaining member is a snap-on clip including locking projections engaging corresponding locking notches in said base, and wherein said base further includes at least one release notch which is overlapped by said snap-on clip, wherein said release notch provides access for removing said clip.

16. A glass workpiece conveyor for a glass washing machine, said conveyor comprising:

a frame;

a pair of lower rails attached to and extending along said frame;

a plurality of workpiece supporting rollers positioned along said pair of lower rails;

a pair of upper rails attached to and extending along said frame above said lower rails;

a plurality of workpiece engaging rollers positioned along said upper rails, wherein said plurality of workpiece supporting rollers and said plurality of workpiece engaging rollers are adapted to convey a glass workpiece through the glass washing machine; and a pair of bearing stands rotatably supporting each said roller, each said bearing stand including a base removably attached to one said rail, a bearing attached to said base and rotatably supporting said roller, and a releasable bearing retaining member attaching said bearing to said base, further including a groove in said bearing, wherein a portion of said retaining member is received in said groove.

17. The conveyor of claim 16 wherein said bearing stands supporting said workpiece engaging rollers, said retaining member adjustably positions said bearing relative to said base.

18. The conveyor of claim 17 wherein in said bearing stands supporting said workpiece supporting rollers said bearing retaining member is a snap-on clip including locking projections engaging corresponding locking notches in said base, and wherein said base further includes at least one release notch which is overlapped by said snap-on clip, wherein said release notch provides access for removing said clip.

* * * * *

UNITED STATES PATENT AND TRADEMARK OFFICE
CERTIFICATE OF CORRECTION

PATENT NO. : 5,964,337
DATED      : October 12, 1999
INVENTOR(S): Michael A. Hallahan It is certified that error appears in the above-identified patent and that said Letters Patent is hereby corrected as shown below:

Column 8 Line 28, Claim 6, "of claim wherein" should read
--of claim 1 wherein--.

Signed and Sealed this

Ninth Day of May, 2000

Attest:

Q. TODD DICKINSON

Attesting Officer

Director of Patents and Trademarks